(12) United States Patent
Navarra Pruna

(10) Patent No.: US 9,017,062 B2
(45) Date of Patent: Apr. 28, 2015

(54) COMPACT SLIDE RAIL FOR INJECTION MOLDS

(76) Inventor: Alberto Navarra Pruna, Sant Just Desvern (ES)

( * ) Notice: Subject to any disclaimer, the term of this patent is extended or adjusted under 35 U.S.C. 154(b) by 0 days.

(21) Appl. No.: 14/123,385

(22) PCT Filed: Jun. 1, 2011

(86) PCT No.: PCT/ES2011/070396
§ 371 (c)(1),
(2), (4) Date: Dec. 2, 2013

(87) PCT Pub. No.: WO2012/164110
PCT Pub. Date: Dec. 6, 2012

(65) Prior Publication Data
US 2014/0106022 A1    Apr. 17, 2014

(51) Int. Cl.
*B29C 45/33*    (2006.01)
*B29C 45/66*    (2006.01)
*B29C 45/72*    (2006.01)

(52) U.S. Cl.
CPC ............... *B29C 45/66* (2013.01); *B29C 45/332* (2013.01); *B29C 45/72* (2013.01)

(58) Field of Classification Search
CPC ........ B29C 45/66; B29C 45/72; B29C 45/332
USPC .............. 425/547, 441, 589, DIG. 5, DIG. 58
See application file for complete search history.

(56) References Cited

U.S. PATENT DOCUMENTS

| | | | | |
|---|---|---|---|---|
| 4,515,342 A | * | 5/1985 | Boskovic | 249/122 |
| 4,889,480 A | * | 12/1989 | Nakamura et al. | 425/577 |
| 4,923,388 A | * | 5/1990 | Nakamura | 425/577 |
| 5,234,329 A | * | 8/1993 | Vandenberg | 425/186 |
| 5,312,243 A | * | 5/1994 | Mertz | 425/577 |
| 5,397,226 A | * | 3/1995 | Vandenberg | 425/192 R |
| 5,407,344 A | * | 4/1995 | Rombalski et al. | 425/190 |
| 6,093,015 A | * | 7/2000 | Navarre | 425/556 |
| 6,116,891 A | * | 9/2000 | Starkey | 425/556 |
| 6,126,429 A | * | 10/2000 | Burger et al. | 425/169 |
| 6,443,723 B1 | * | 9/2002 | Buttigieg | 425/214 |

(Continued)

FOREIGN PATENT DOCUMENTS

| | | |
|---|---|---|
| CN | 201333772 | 10/2009 |
| EP | 1498248 | 1/2005 |

(Continued)

OTHER PUBLICATIONS

International Search Report for corresponding application PCT/ES2011/070396 filed Jun. 1, 2011; Mail date Feb. 22, 2012.

(Continued)

*Primary Examiner* — Yogendra Gupta
*Assistant Examiner* — Emmanuel S Luk
(74) *Attorney, Agent, or Firm* — Cantor Colburn LLP

(57) ABSTRACT

A slide, like those used in injection molds, includes a closure unit with a first complementary profile complementary with the second complementary profile of a slide body, the complementary profiles being double wedge-shaped, where the double wedge has oblique end surfaces determining a fixed positioning and locked position between the closure unit and the slide body, such that the slide body includes a rail in the lower base coupleable to a slide guide on which the slide body slides.

10 Claims, 5 Drawing Sheets

(56) References Cited

U.S. PATENT DOCUMENTS

| | | | |
|---|---|---|---|
| 6,659,760 B2 * | 12/2003 | Liao et al. | 425/577 |
| 7,104,774 B2 * | 9/2006 | Buttigieg | 425/190 |
| 7,175,421 B2 * | 2/2007 | Takemoto et al. | 425/577 |
| 7,677,878 B2 * | 3/2010 | Chen et al. | 425/190 |
| 7,713,054 B2 * | 5/2010 | Mai | 425/441 |
| 8,147,238 B1 * | 4/2012 | Zou et al. | 425/577 |
| 2004/0247726 A1 * | 12/2004 | Takemoto et al. | 425/190 |
| 2005/0098295 A1 * | 5/2005 | Dubay | 164/312 |
| 2005/0208172 A1 * | 9/2005 | Buttigieg | 425/441 |
| 2005/0236727 A1 * | 10/2005 | Niewels | 264/40.1 |
| 2006/0045933 A1 * | 3/2006 | Chen et al. | 425/438 |
| 2008/0124425 A1 * | 5/2008 | Chen et al. | 425/545 |
| 2008/0236221 A1 * | 10/2008 | Chen et al. | 70/266 |
| 2008/0276744 A1 * | 11/2008 | Chen et al. | 74/469 |
| 2009/0181119 A1 * | 7/2009 | Chen et al. | 425/345 |
| 2009/0324767 A1 * | 12/2009 | Kloeppel et al. | 425/190 |
| 2012/0107446 A1 * | 5/2012 | Wang et al. | 425/556 |

FOREIGN PATENT DOCUMENTS

| | | |
|---|---|---|
| EP | 1498248 A1 | 1/2005 |
| ES | 2046938 | 2/1994 |
| ES | 2046938 A2 | 2/1994 |
| KR | 20070028421 A | 3/2007 |
| WO | 0132393 | 5/2001 |
| WO | 0132939 A1 | 5/2001 |

OTHER PUBLICATIONS

European Search Report for corresponding application EP11866931; Report Dated Oct. 6, 2014.

* cited by examiner

COMPACT SLIDE RAIL FOR INJECTION MOLDS

TECHNICAL FIELD

The present invention relates to the field of manufacturing of injection molds and, more specifically, to a slide like those used in injection molds, which slide has been considerably perfected in order to achieve a perfect fit between it and the mold where it must be housed, as well as between the slide itself and the sliding rail, and a frictionless safety position when opening the mold for perfect coupling in the maneuver for closing the mold.

BACKGROUND

The field of injection molds, frequently employs slides intended for molding figure shapes on the sides of the product to be manufactured which are impossible to reproduce through a traditional conventional molding system since they are basically formed by a mold plate and a cavity plate, and it only has a single opening movement requiring all the machined parts made to be demolded in the mold opening direction.

Molds having to manufacture parts with figures having shapes which could not be demolded by the conventional method require the application of mechanisms named slides, which are responsible for transmitting movements perpendicular to the mold opening during the opening and closing process, which allow perpendicularly demolding the mentioned "negatives" when opening the mold and before demolding the injected product.

Therefore, the slide itself must move on guides or rails which determine the path it must take in each particular case to allow demolding the figure in question.

The guides of these slides must be integral with the mold plate so that the slides themselves can be moved with total precision when opening or closing the mold.

The mechanism which usually allows the slides to move in the mold opening or closing movements are commonly referred to as inclined guides, and they are housed in the cavity plate, these inclined guides housed with specific degrees of inclination in each case must coincide with housings machined in the slides with the same degrees of inclination. During the mold opening and closing process, the slide slides on the guide rail, whereas by means of the housing of the inclined guide, said inclined guide forces the slide, to move with a path equivalent to degree of inclination and along it for the entire time of contact with the slide.

At the precise moment in which the inclined guide loses contact with the housing of the slide, the latter stops sliding on the guide rail, and the slide needs to be locked so as to prevent it from being able to move when completely opening the mold and being duly positioned so that at the moment of closing the mold, the inclined guide coincides perfectly with the housing of the guide in the slide and can once again slide on the guide rail until completely closing the mold and continue with the new injection cycle.

There are different solutions for stabilizing the slide body with respect to the slide guide when the oblique guide of the corresponding oblique cavity is decoupled from the slide body, which occurs when opening the mold, the solution in Spanish patent 9100478, owned by the applicant of this application, being worth mentioning; it consists of arranging of permanent magnets at the bottom of the slide guide which stabilize the slide in any position.

Currently existing slides base the positioning inside the mold on generating closing pressure between the plate of the mold and the tightening wedge, so current slides follow the determined scheme and comprise several parts such as a tightening wedge, the slide itself where the figure to be reproduced is machined, the sliding slide guide and the inclined guide.

The tightening wedge and the slide contact obliquely when closing the mold, so there is not a perfect locking between these two parts, it being necessary to establish a specific calibration of the tightening wedge and of the slide in each specific case to adjust them to the plates of the mold.

An additional problem of these slides is that very high pressures can be generated when the plastic enters the injection cavity in a liquid state, which high pressures in extreme cases could even longitudinally slide the figure attachment and the slide associated with it, causing a slight separation or opening of the plates of the mold. This would have an impact on the molded part which would no longer have the desired dimensions, or produce burrs which would not allow the molded part to have the desired quality.

The applicant is unaware of the existence of slides for injection molds which allow efficiently solving the described problem, which enable separately adjusting the parts of the slide with respect to the plates of the mold and prevent the possible recoil of the slide body due to the pressure for injecting the plastic material into the mold.

BRIEF SUMMARY

The compact slide for injection molds of the present invention meets unprecedented expectations within the molding sector since this system seeks to unify a large number of improvements on the traditional system in a single unit.

This compact slide is of the aforementioned type and comprises a slide body where the figure to be reproduced is machined, or that slide body can incorporate a figure attachment, that slide body being movable whether it is a single slide body and incorporates the figure to be reproduced or it is split into the slide body and figure attachment, on a slide guide sliding by the action of an inclined guide on an inclined cavity defined in the slide body, said slide guide being in a fixed position with respect to the mold plate and said inclined guide being in a fixed position with respect to a closure unit fixable to the cavity plate of the mold.

According to the invention, this compact slide has the particularity that the slide body and the closure unit have double wedge-shaped complementary profiles in facing surfaces with oblique end surfaces the contact of which determines a single fixed locked position between the slide body and the closure unit.

This locking between the closure unit and the slide body with a single double wedge-shaped profile achieves a general locking fit with a precision which allows machining indistinctly either of the two halves starting from the same point "0" and for all the machining performed in the longitudinal locking direction.

Once the first fit is achieved, any of the parts can be machined separately, with the certainty that when they are fitted together again, all the machined figures will continue to have the same starting point, as if it were a single part.

Starting from this premise, it is possible to separately machine the cavity of the figure housing with the required tolerances, whereas the figure attachment can be machined separately, with the certainty that both parts will perfectly coincide, without a later adjustment being necessary, such as that used in the conventional system.

The compact slide of the invention provides greater effectiveness and has the important advantage that it can be adjusted indistinctly, since complete fit is required only between the slide body and the closure unit.

The closure unit incorporates housings for fixing screws for fixing in the cavity plate of the mold and it incorporates an inclined guide having a specific angle of inclination.

The slide body, with a profile symmetrical to the closure unit, has a T-shaped rail machined in the lower base perpendicular to the symmetrical profile, as well as the cavity for housing the inclined guide of the closure unit, the figure to be reproduced can be machined directly in the slide body or in a figure attachment that is movable together with the slide body, the slide body and the figure attachment being attached, if they are different bodies, through a "dovetail" attachment in the front face of the slide body, where two through holes for allowing the passage of cooling tubes would also be machined in the longitudinal direction.

The slide guide comprises a profile rectangular with a U-shaped channel on the sides as well as housings for the fixing screws in the mold plate and a device for locking the slide body in the mold open position.

Said slide guide comprises an additional safety catch formed by a retractable retaining stop for retaining the slide body on the slide guide during the mold open position. This additional safety catch is particularly applicable, though in a non-limiting manner, in those cases in which the compact slide works in a vertical position, since in this position the locking device may not be enough to slow down the inertia of the movement of the slide according to the mold opening speed and support the weight of the slide body and of the figure attachment coupled thereto.

For high productivity molds and those from which great reliability is demanded, the slide guide can incorporate an electromagnetic limit switch which does not require external connection cables since it can monitor the entire mold opening and closing process by means of an internal contact connector with the certainty of the correct positioning of all the slide mechanisms it may require.

The figure attachment, formed by a steel block of specific dimensions, incorporates a "dovetail" shaped projection in the transverse direction, and dimensionally suitable for the housing of the slide body.

Said figure attachment incorporates previously machined cooling bore holes serving to cool the figure machined in this attachment during the injection process.

The presented invention allows coupling many figure attachments since the double wedge locking system considerably increases the mechanical resistance to positioning, so a compact slide unit allows a wide range of figure surfaces, unifying the machining and simplifying the design and construction of the mold.

The machining of the housings of the compact slide in the mold are very simple, only a rectangular housing with little depth and screws for securing the closure unit and another housing with similar features are required. Likewise, there are other screws for securing the slide guide, whereas the application of screws is not required for the remaining components since it is designed for this purpose.

The figure attachment is manufactured with an integrated cooling circuit covering its entire width, which allows optimizing the thermal jump during the injection process, the attachment is assembled in the slide body through the fly wing-shaped guide and secured to it through the cooling conduits, which already incorporate quick connectors for automatically connecting the conduits without requiring subsequent couplings.

Clearance in the bore holes for the passage of the cooling tubes allows easily correcting the small machining mismatches, as well as expansions themselves resulting from the injection process.

The slide guide incorporates a locking device for locking the slide body, formed by a runner incorporating a front roller and a tensioning spring placed transversely in the front part thereof; this roller fits in a groove machined in the slide body and positions it on the guide when the mold is opened. This locking is necessary for keeping the slide body positioned during the entire mold opening cycle; when the mold is closed the guide of the closure unit fits perfectly and can locate the slide in its closed position for the next injection.

It is necessary to place a safety stop limiting the path outside the usual movement limits when the compact slide works in the vertical position and the weight thereof with the figure insert is considerable; this stop must be easy to access in case the slide must be handled during the production process.

To simplify this task, installing a steel cylinder with a bore hole in which a spring is incorporated and with a machining on the part opposite the rectangular-shaped bore hole of the spring for being positioned and an inclined ramp in the upper part, correctly housed in the slide guide, has been envisaged; this cylinder can support the weight of the slide if the slide becomes detached due to any mishap. The ramp of the cylinder facilitates assembling the slide, and slight pressure on the ramp of the cylinder allows compressing the spring of the cylinder when disassembling the slide.

With the aforementioned features the compact slide for injection molds provides important advantages, among which the following are worth highlighting:

Locking by means of double wedge profiles between the slide body and the closure unit provides this slide with high mechanical resistance since it is only limited by the resistance of the material itself from which it is manufactured, as well as by the resistance of the plates of the mold where it is located.

This slide is much more compact than any of those commonly used, in addition to requiring much smaller dimensions than current systems, with the subsequent saving in material, as well as requiring less space to operate, drastically reducing manufacturing costs.

As a result of the described locking system and the great mechanical resistance it offers as a support base for supporting the counter pressure of the injected plastic, it is possible to considerably increase the surface of the figure attachment, whereby the possibility of interchanging attachments of different dimensions with the same base is achieved, increasing the range of application possibilities by simply changing said attachment, which represents considerably reducing the value of the stock and increasing the service efficacy with minimal investment in the compact slide of the invention.

The locking of the slide has been developed for the purpose of eliminating friction between the slide body and the slide guide, applying a rotating roller in the contact area between both parts and the roller rotates with the pressure of a spring along the entire path until encountering an expressly machined groove where the rotating roller is housed, thereby locking the slide.

Any type of friction between steels is eliminated with this rotating roller, and the compact slide can be applied in mold manufacturing for the pharmaceutical or food sector, where preventing any type of contamination through friction between materials is essential.

The interchangeable figure attachments can be manufactured with different materials and thus be adapted to the specific needs of each case, without changing the mechanical features of the compact slide at all.

The figure attachments with an integrated cooling circuit only need to be machined in the figure area for application in the final assembly.

The connection tubes for the cooling circuit are designed for being used through the slide body and retaining the figure attachment with limited play or side sliding for facilitating the fit in the mold.

BRIEF DESCRIPTION OF THE DRAWINGS

To complement the description being made and for the purpose of aiding to better understand the features of the invention, a set of drawings is attached to the present specification in which the following has been depicted with an illustrative and non-limiting character.

DETAILED DESCRIPTION

As can be seen in said figures, the compact slide comprises a closure unit (1) intended for being fixed on a cavity plate (C) of an injection mold and a slide body (2) bearing a figure attachment (4) and assembled with the possibility of longitudinal movement on a slide guide (3) intended for being fixed on a mold plate (M) of the injection mold. This view shows how the slide body (2) and the figure attachment (4) are two different bodies, but both can be a single part.

Figure 1:
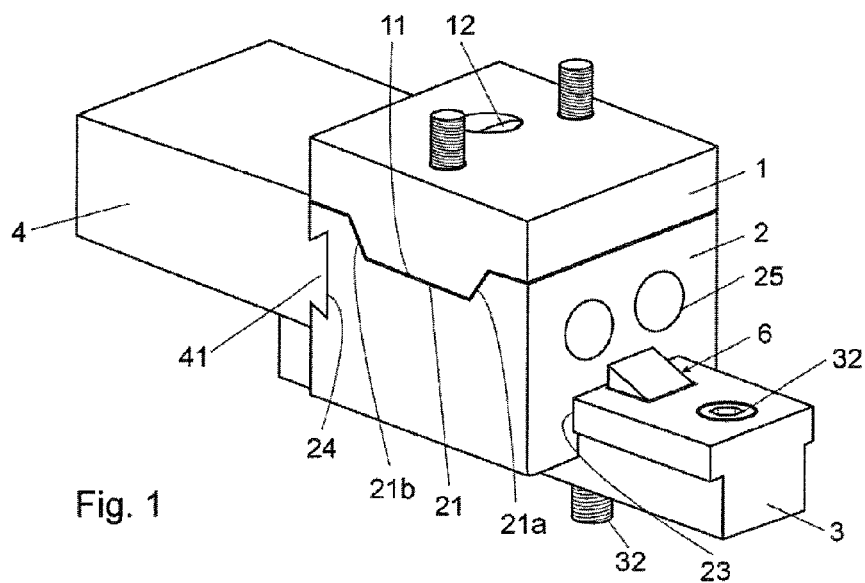
FIG. 1 shows a perspective view of an embodiment of the compact slide for injection molds with the closure unit and the slide body in the locked position, corresponding to the injection mold closed position.
Figure 3:
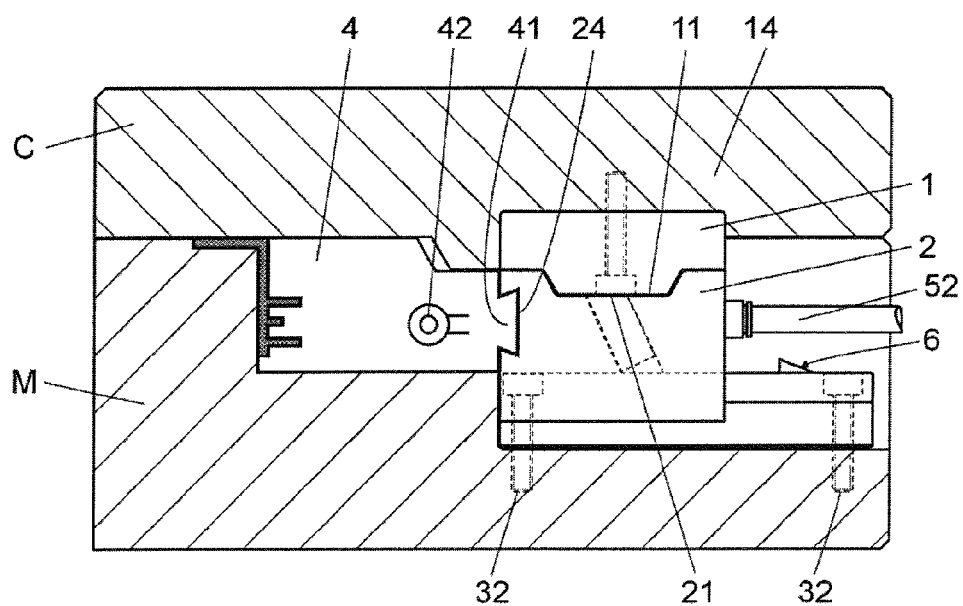
FIG. 3 shows a cross-section elevational view of the compact slide of the preceding figures assembled while being used in an injection mold depicted in the closed position.

The closure unit (1) and the slide body (2) have in facing surfaces double wedge-shaped complementary profiles (11) and (21) with oblique end surfaces (11a, 11b) and (21a, 21b) the contact of which determines a single fixed locked position between the closure unit (1) and the slide body (2), as shown in FIGS. 1 and 3.

The closure unit (1) comprises an inclined guide (12) provided with a certain inclination, intended for being housed in the inclined cavity (22) of the slide body (2) and for causing a forwards and backwards movement of the slide body (2) with respect to the slide guide (3) when opening and closing the mold.

The closure unit (1) has housings (13) for being fixed to the cavity plate (C) of the mold by means of screws (14); in turn, in the example shown, the slide guide (3) has housings (31) for being fixed by means of screws (32) to the mold plate (M), although said guide slide (3) being able to be defined in the mold plate (M) itself is not disregarded.

The slide body (2) has a transverse rail (23) with a T-shaped section in the base for being assembled on the slide guide (3), also with a T-shaped section.

Said slide body (2) has a "fly wing"-shaped groove (24) in its front surface for coupling the figure attachment (4), which has a projection (41) complementary to the groove (24) for such purpose.

This groove (24) allows interchangeably assembling different figure attachments (4) on the slide body (2).

The slide body (2) has through holes (25) in the longitudinal direction for allowing the passage of cooling tubes (5) towards a cooling circuit (42) integrated in the figure attachment (4) and coupleable with said cooling tubes.

The cooling tubes (5) comprise quick connectors (51) for coupling cooling conduits (52).

Figure 2:
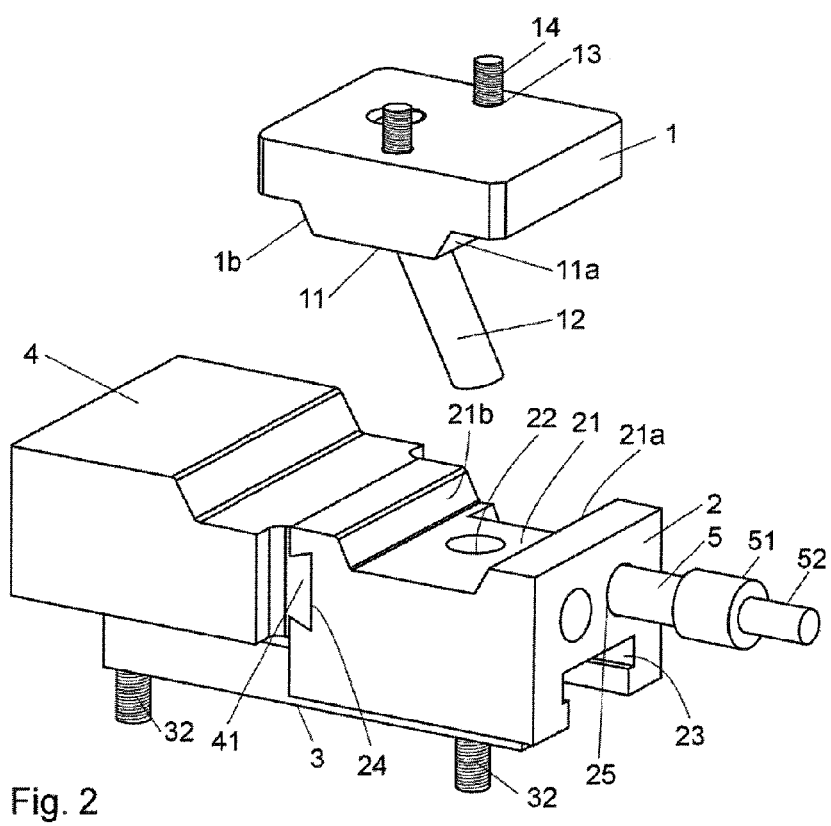
FIG. 2 shows a perspective view of the compact slide with the closure unit in a position spaced from the slide body, corresponding to a mold open position.
Figure 4:
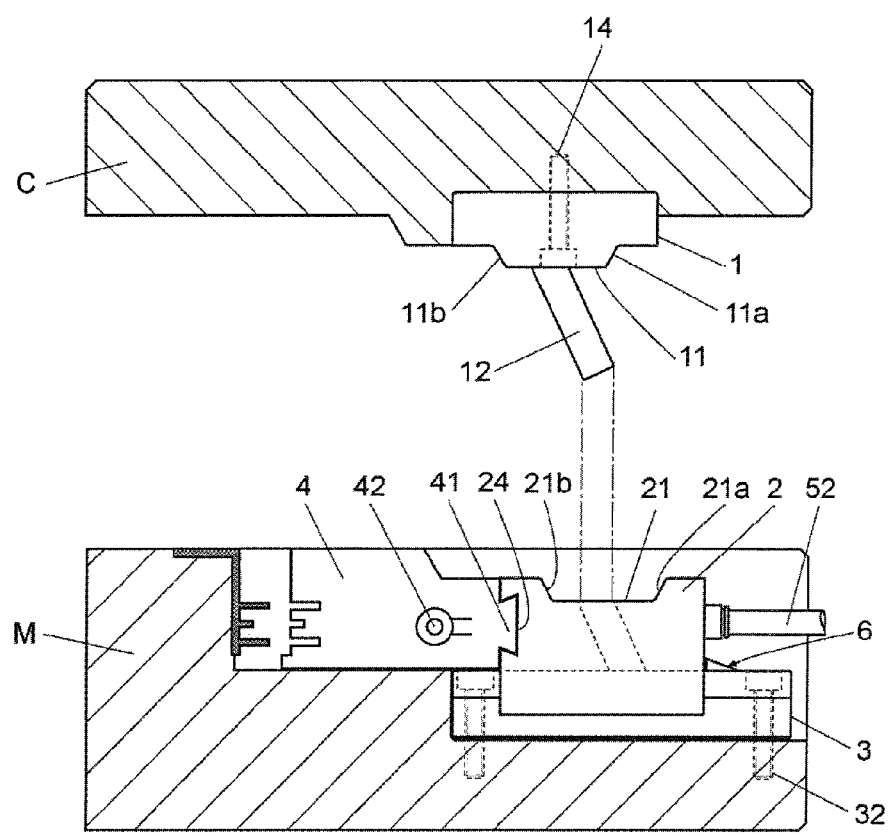
FIG. 4 shows a view similar to that of FIG. 3, but with the injection mold in the open position in which the figure attachment and the slide body have been moved out of the mold.

The slide guide (3) has a locking device (6) for locking the slide body (2) at a point of its path corresponding to the entry and exit position of the inclined guide (12) in the inclined cavity (22) when opening and closing the injection mold. This position of the slide body (2) can be seen in FIGS. 2 and 4.

Figure 5:
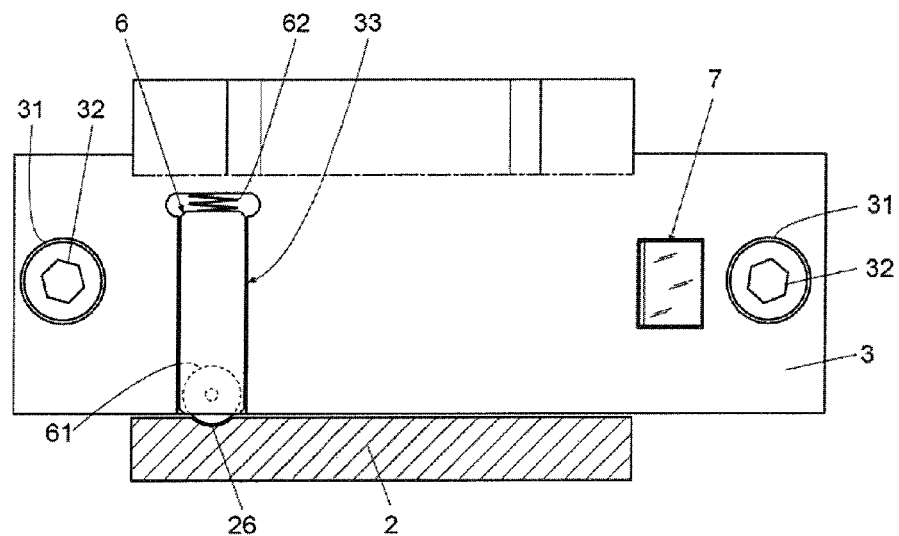
FIG. 5 shows a plan and cross-section view of the slide guide and of the slide body assembled on it to allow observing the locking device and the additional safety catch included in the slide guide for positioning the slide body.

Said locking device (6) is formed by a runner incorporating a front roller (61) and a tensioning spring (62) transversely housed in a recess (33) of the slide guide (3). When the slide body (2) reaches the locked position, the roller (61) fits in a groove (26) machined in the slide body (2) for such purpose, as shown in FIG. 5.

In the example shown, the slide guide (3) comprises an additional safety catch formed by a retractable retaining stop (7) for retaining the slide body (2) on the slide guide (3) during the mold open position. This retractable stop is applicable particularly in those cases in which the slide guide (3) is oriented vertically and the locking device (6) is not enough to support the weight of the slide body (2) and of the shape attachment coupled thereto.

Figure 6:
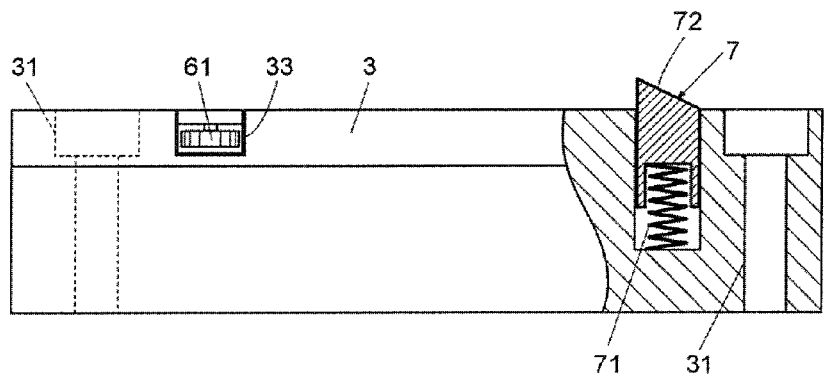
FIG. 6 shows a partial cross-section elevational view of the slide guide to allow observing the thrust spring of the additional stop for the slide body.

In the example shown in FIG. 6, said retractable stop (7) is formed by a steel cylinder housed in the slide guide (3) and provided with a rear bore hole in which a thrust spring (71) is incorporated biased to keep it in the protruding position with respect to the slide guide (3).

Said retractable stop (7) has at its front end a rectangular positioning machining and an inclined ramp (72) oriented towards the rear area of the slide guide to allow automatically concealing the retractable stop (7) when assembling the slide body (2) at the rear end of the slide guide.

Figure 7:
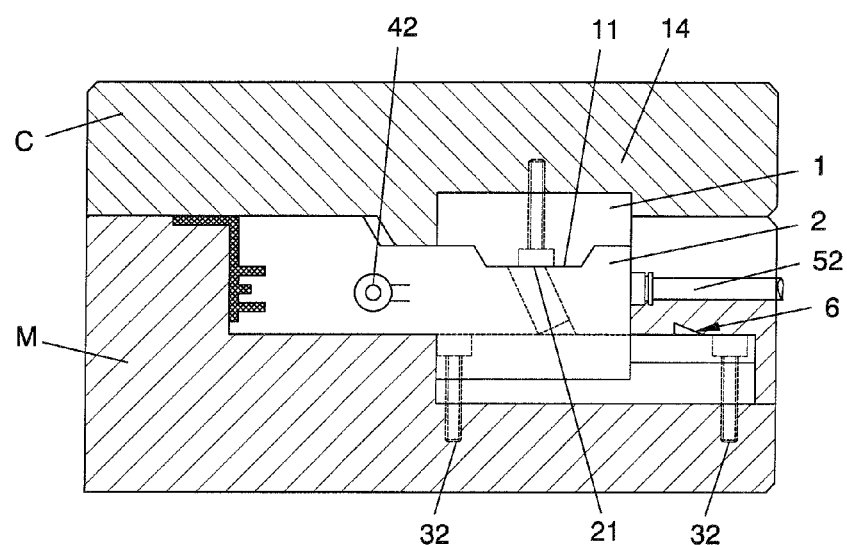
FIG. 7 shows an elevational view of a section of the compact slide similar to FIG. 3 in which unlike the other, there is no separate figure attachment part of the slide body, but both are a single body.

Finally, FIG. 7 depicts a cross-section view similar to that depicted in FIG. 3 in which the attachment body figure and the slide body are not separate parts, but both are a single body. The reference numbers indicated in said figure correspond with those explained in the above figures and in this case the slide body has the figure to be reproduced at its machined end, as shown in that figure.

Having sufficiently described the nature of the invention as well as a preferred embodiment, it is hereby stated for all relevant purposes that the materials, shape, size and arrangement of the described elements could be modified provided that this does not entail an alteration of the essential features of the invention which are claimed below.

The invention claimed is:

1. Compact slide for injection moulds, comprising
   a slide body movable on a slide guide and
   a closure unit fixable to the cavity plate of the injection mould;
   wherein the slide body and the closure unit have in facing
      surfaces double wedge-shaped complementary profiles with oblique end surfaces and the contact of which determines a fixed locked position between the slide body and the closure unit, wherein a first oblique end surface is inclined in a first direction and a second oblique end surface is inclined in a second direction, the first direction being disposed opposite the second direction.

2. Compact slide according to claim 1, wherein the closure unit comprises housings for fixing screws for fixing to the cavity plate of the mould and it incorporates the inclined guide with a specific angle of inclination.

3. Compact slide according to claim 1, wherein the slide body comprises a rail in the lower base coupleable to the slide guide, a transverse groove in the front face for coupling figure attachments and through holes in the longitudinal direction for allowing the passage of cooling tubes.

4. Compact slide according to claim 1, wherein the figure to be reproduced is directly machined in the slide body, the figure attachment body not being necessary.

5. Compact slide according to claim 1, wherein the slide guide comprises housings for the fixing screws for fixing to the mould plate and a device for locking the slide body in the mould open position.

6. Compact slide according to claim 3, wherein the locking device for locking the slide body comprises a runner incorporating a front roller and a tensioning spring biased to keep the front roller in a protruding position and keep it locked in a groove, machined in the slide body, during the mould opening cycle.

7. Compact slide according to claim 1, wherein the slide guide comprises an additional safety catch formed by a retractable retaining stop for retaining the slide body on the slide guide during the mould open position.

8. Compact slide according to claim 7, wherein the retractable stop is formed by a steel cylinder housed in the slide guide, having a bore hole at its rear end in which a thrust spring is incorporated towards a protruding position and, at its front end, a rectangular positioning machining and an inclined ramp oriented towards the rear area of the slide guide.

9. Compact slide according to claim 3, wherein the figure attachment comprises an integrated cooling circuit coupleable to the cooling tubes.

10. Slide according to claim 3, wherein the cooling tubes comprise quick connectors for coupling cooling conduits.

* * * * *